United States Patent [19]

Moe

[11] 4,331,966
[45] May 25, 1982

[54] INFORMATION STORAGE DEVICE AND METHOD OF FORMING SAME

[75] Inventor: Erik Moe, Huntington Beach, Calif.

[73] Assignee: Storage Technology Corporation, Louisville, Colo.

[21] Appl. No.: 194,384

[22] Filed: Oct. 6, 1980

[51] Int. Cl.³ ............................................. G01D 15/34
[52] U.S. Cl. .................... 346/137; 346/135.1; 369/284
[58] Field of Search ............................ 346/135.1, 137; 369/283, 284, 286

[56] References Cited

U.S. PATENT DOCUMENTS

| | | | |
|---|---|---|---|
| 4,038,663 | 7/1977 | Day | 346/137 X |
| 4,074,282 | 2/1978 | Balas | 346/137 X |
| 4,264,911 | 4/1981 | Wilkinson | 346/137 X |

OTHER PUBLICATIONS

Bartolini et al.; Optical Disk Systems Emerge; IEEE Spectrum, Aug. 1978, pp. 20-28.

*Primary Examiner*—Joseph W. Hartary
*Attorney, Agent, or Firm*—Woodcock, Washburn, Kurtz, Mackiewicz & Norris

[57] ABSTRACT

An information storage device for recording by means of a radiant energy beam such as a laser in which a disc-shaped base member, one or more regions of recording medium and one or more disc-shaped protective layers (or "windows") are arranged to form a layered structure or sandwich. The innermost portions of the protective layer(s) are fastened to the corresponding portions of the base member and an annular support ring radially spaced from the outermost edge of the base member is fastened to the outer edge of the protective layer(s). A circumferential gap is thereby provided between the annular support and base member to permit expansion and contraction of the base member.

12 Claims, 3 Drawing Figures

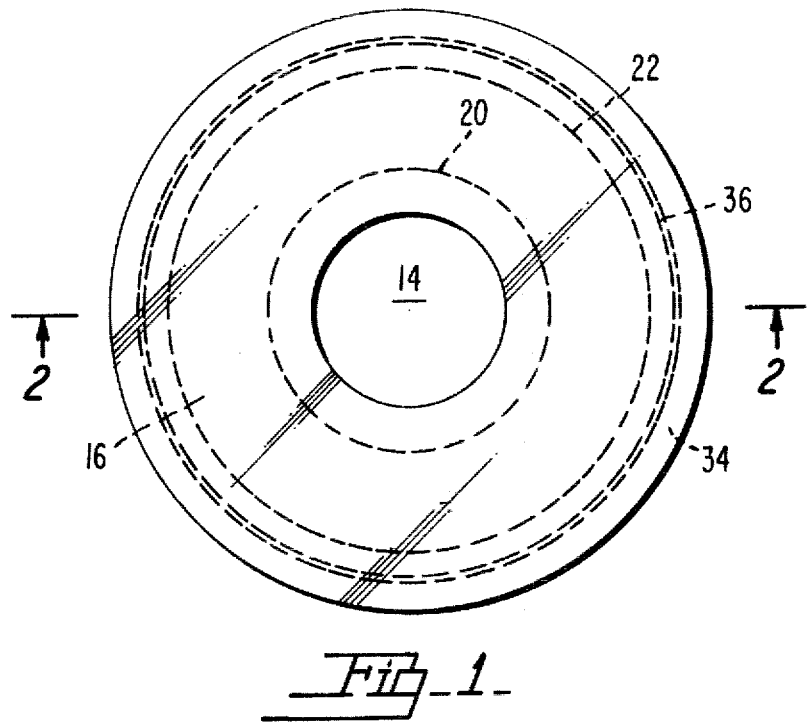
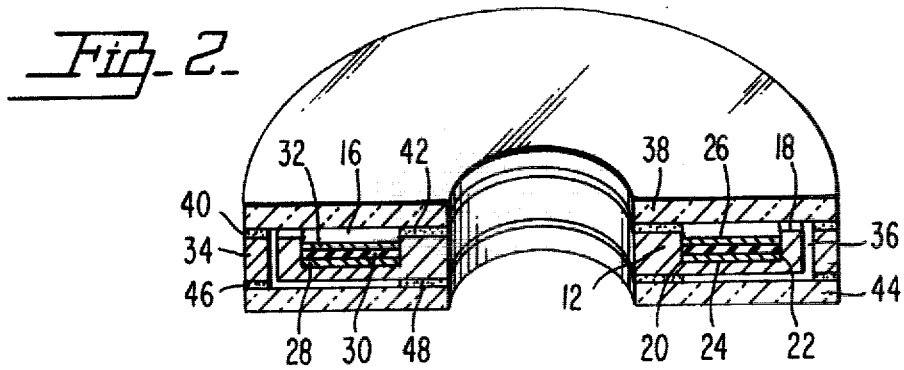
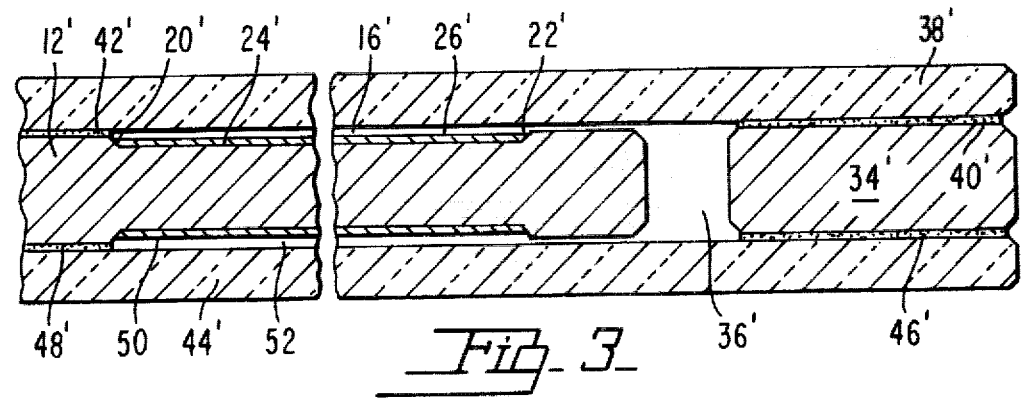
Fig. 1
Fig. 2
Fig. 3

INFORMATION STORAGE DEVICE AND METHOD OF FORMING SAME

Several different types of optical video disc systems have been proposed and constructed for the recording of information (see, for example, IEEE Spectrum, August 1978, pages 20–28, "Optical Disk Systems Emerge" by R. A. Bartolini, A. E. Bell, R. E. Flory, M. Lurie and F. W. Spong). Optical video discs typically include a substrate or structural support layer, an information storage layer overlying at least a portion of one or both sides of the substrate and a protective layer overlying each information storage layer. A source of energy, which is usually a laser beam, is scanned over the storage layer so as to write or read the desired information onto or from the storage layer. In some instances, the protective layer is applied after the information has been written while, in others, the protective layer, recording layer and substrate are formed into a unitary, laminated structure before information is written. The latter case, which is the preferred environment for the present invention, results in a so-called DRAW (direct read after write) record configuration which requires no chemical or physical processing of the record after the writing beam has recorded the desired information. The recorded information is preserved by the record structure itself and may be read out directly at will thereafter.

Many different combinations of materials and various structural configurations have been employed for optical video discs. In a single-sided arrangement, either the protective layer or the substrate or both may be transparent to the read/write energy. Information is read by transmission of energy through the entire structure or by reflection of energy from a reflective coating which is selectively exposed. Where two sided recording is employed, each recording layer is associated with an overlying transparent protective layer and read-out is accomplished by reflection of energy from a reflective coating associated with the storage layer.

The protective layer, in addition to preventing physical or chemical damage to the information storage layer, also serves physically and optically to separate dust particles and other foreign matter from the storage layer. The protective layer is made sufficiently thick relative to the depth of focus of the optical system so that dust and foreign matter are out of focus and thereby have negligible effect on the recording and recovery of information. Several different configurations of the general type described above are shown in U.S. Pat. No. 4,074,282 granted Feb. 14, 1978 to C. Balag et al.

When the supporting substrate and overlying protective member of "window" are made of two different materials, it is nevertheless necessary that they be compatible and maintain structural integrity over the intended range of operating and storage temperatures for the disc. One combination of materials which is particularly advantageous from a cost standpoint comprises a metallic substrate (such as the aluminum disc commonly employed for magnetic recording) and overlying glass protective layers.

However, if metal and glass (or two other materials having different thermal coefficients of expansion) are fastened together to form a sealed, laminated structure, the permissible temperature limit for use of such a structure may be unduly or undesirably restricted. For example, typical thermal coefficients of expansion of aluminum and glass are in a ratio of 2.8 to 1. Typical temperature limits which are desirable for optical discs involve storage over a range of −40° C. to +65° C. and operation over a range of +15° C. to +55° C.

Under those conditions, where a simple glass-aluminum laminate is employed, the difference in thermal coefficients between the two materials has been found to result in excessive stresses and cracking or "peelback" of the protective layer.

The present invention is directed to providing an information storage device of the disc type which overcomes the above-described thermal and structural problems. In order to take advantage of the various attributes of combinations of two different materials such as a metal-glass combination (low cost, strength and ease of manufacture) structural arrangements other than a simple sandwich or laminate have been devised.

In accordance with the present invention an information storage device comprises a disc-shaped base member and at least one disc-shaped protective member overlying the base member. A radiant-energy-responsive recording medium is disposed between the base member and the protective member within an annular information storage region. An outer support member (preferably ring-shaped) is provided having an inner radius greater than an outer radius of the base member but less than the outer radius of the protective member. Means are provided for fastening the outer radius portion of the protective member to the support member and for fastening the protective member to the base member radially inwardly from the storage region. As a result of the above-described configuration, a circumferential gap is provided between the inner edge of the support member and the outer edge of the base member for permitting relative radial movement between the base member and the protective member.

This invention will be better understood by consideration of the following description in conjunction with the accompanying drawing in which:

FIG. 1 is a plan view of an information storage device constructed according to the present invention;

FIG. 2 is a sectional view taken along the line 2—2 of FIG. 1; and

FIG. 3 is a partial sectional view of an alternative embodiment of the invention.

Referring to FIG. 1 in conjunction with FIG. 2 a "single-sided" information storage device or record (not drawn to scale) is illustrated. The record comprises a disc-shaped or annular base member 12 preferably fabricated from a metal such as aluminum. The base member 12 includes a relatively large central aperture 14 and a recessed, annular information storage region 16 on one side 18 of the base member 12. The inner radial extremity of information storage region 16 is defined by a first wall 20 while the outer radial extremity of storage region 16 is defined by a second wall 22, each of walls 20 and 22 being substantially upright relative to a recessed surface 24 of base member 12.

A multi-layered, radiant-energy-responsive recording medium indicated generally by reference numeral 26 is disposed within information storage region 16. Recording medium 26 may take various forms depending upon the particular application desired. One suitable arrangement comprises a first energy reflective layer 28 of for example, nickel coated along a lower-most surface within the recessed information storage region 16. A nickel coating may be deposited by various methods including electroless plating or vacuum deposition. A transparent layer 30 of passivation material such as silicon dioxide is added over reflective layer 28 by vacuum deposition or sputtering. An energy sensitive layer 32 such as tellurium is then added over the passivation layer 30 by vacuum deposition. Appropriate thicknesses for such materials are known in the art as is described, for example, in the above-noted article by Bartolini et al and the references cited therein.

The information storage device of FIGS. 1 and 2 further comprises an annular support member 34 having an inner radius greater than the outer radius of base member 12 so as to provide a circumferential gap 36 between support member 34 and base member 12. Preferably, annular support member 34 is formed initially as an integral part with base member 12 and is then separated from base member 12 by a punching or coining process. In this manner, and for reasons as will appear below, the thickness of support member 34 will be substantially equal to that of base member 12 and the radial dimension of circumferential gap 36 will be readily determined. Gap 36 typically is of the order of one-sixteenth inch.

A disc-shaped or annular protective member 38 is disposed in overlying relationship with base member 12, annular support member 34 and recording medium 26. The protective member 38 preferably is formed from glass having a thickness, for example, of 0.03937 inches. The outer diameter of glass protective member 38 is substantially equal to the outer diameter of annular support member 34. The inner diameter of protective member 38 is substantially equal to that of base member 12.

Means 40,42 are provided for fastening the outer radius portion of glass protective member 38 to annular support member 34 and for fastening the inner radius portion of protective member 38 to base member 12 in a zone radially inwardly from storage region 16. As is shown in FIG. 2, the fastening means 40,42 comprises a relatively thin layer of adhesive material such as a cyano acrylate compound. The adhesive material 40,42 is applied over the upper surface of base member 12 between inner wall 20 and central aperture 14 and over substantially all of the upper surface of outer annular support member 34. It should be noted that the portion of base member 12 between wall 20 and gap 36 is not fastened to protective layer 38. In this manner, the outer radius portion of base member 12 is free to expand or contract radially with respect to protective member 38.

The adhesive material 40,42 is selected to exhibit a low percentage elongation with temperature and to possess a shear strength of, for example, greater than 2300 pounds per square inch.

A second protective member 44 similar to protective member 38 is disposed over the lower surface (as shown in FIG. 2) of base member 12 and annular support member 34. Adhesive material is applied between the lower surface and second protective member 44 in regions 46,48 corresponding to the regions occupied by the adhesive material 40,42 associated with the upper surface of base member 12.

In a typical process for manufacturing the information storage device of FIGS. 1 and 2, a standard aluminum alloy disc (material type 5086-0, H 2E30 Al alloy) of the type employed for magnetic recording discs may be used as a starting point. Such a disc has nominal dimensions of an outside diameter of 14.025 inches, a central aperture having a diameter of 6.625 inches and a thickness of 0.075 inches. The annular support member 34 is formed by punching or coining the aluminum disc to separate it into base member 12 and support member 34, leaving a gap 36 of 0.063 inches.

The information storage region bounded by walls 20 and 22 and lower surface 24 is formed by machining or etching base member 12 to produce a recess 0.002 inches deep between an inner diameter of 9.18 inches and an outer diameter of 13.62 inches (approximately 2½ inch wide annular region). The recording medium 26 comprising layers 28, 30, 32 is then deposited as described previously. Adhesive material preferably less than 0.001 inches thick is deposited along the regions 40, 42, 46, 48. Glass protective layers 38 and 44 which have dimensions corresponding to the outer diameter of support member 34 and the inner diameter of base member 12 and a thickness of, for example, 0.039730 inches, are attached and hemetically sealed with respect to base member 12 and annular support member 34 in a nitrogen atmosphere. The nitrogen gas fills the voids in the vicinity of the recessed recording medium 26 and annular gap 36.

In this manner, the information storage region 16 is enclosed by the combination of annular base member 12, glass protective layers (or "windows") 38, 44, and annular support member 34 and the adhesive fastening means in regions 40, 42, 46 and 48.

The glass protective layers 38 and 44 preferably include anti-reflective coatings to maximize the transmission of read/write energy from and to the recording medium 26.

Referring to FIG. 3, a portion of a two sided information storage device constructed according to the invention is shown. In FIG. 3, the various parts which correspond to parts illustrated in FIGS. 1 and 2 are identified by the same reference numerals followed by a prime (') designation. In FIG. 3, the various parts are illustrated more nearly in proportion as compared to FIGS. 1 and 2. However, the thicknesses of adhesive layers 40', 42', 46', 48' as well as the depth of information storage recess 16' have been enlarged so as to be more readily discernible. Furthermore, the multi-layered recording medium 26' is shown as a single entity although it should be understood that a more typical arrangement would be as is shown in FIGS. 1 and 2 (i.e. a three-layered medium 26). Similar comments would apply to a second recording medium 50 disposed in a second recessed information storage region 52 associated with the underside of base member 12.

As can be seen in FIG. 3, the thickness of the annular support member 34' and the thickness of the base member 12' are equal, the two having been formed from a single disc as was described above. The thickness of adhesive material 40', 42', 46', 48' is relatively small, thereby insuring a slight clearance between the protective members 38', 44' and the base member 12' at the outermost extremity of base member 12'. In this manner, the expected expansion and contraction of base member 12' with temperature does not cause fracture or peelback of the protective members 38', 44'. Rather base member 12' is free to move radially to the extent of the circumferential gap 36'.

While the invention has been described in terms of certain preferred arrangements, it will be readily apparent that various modifications may be made within the scope of the invention which is set forth in the following claims.

What is claimed is:

1. An information storage device comprising: a disc-shaped base member; at least one disc-shaped protective member overlying said base member; a radiant-energy-responsive recording medium disposed between said base member and said protective member within an annular information storage region, said storage region having an inner radius greater than an inner radius of said protective member and an outer radius less than an outer radius of said protective member; an annular support member having an inner radius greater than an outer radius of said base member, but less than said outer radius of said protective member; means for fastening the outer radius portion of said protective member to said annular support member; and means for fastening said protective member to said base member radially inwardly from said storage region; whereby said information storage region is enclosed by the the combination of said base member, said protective member, said support member and said fastening means and a circumferential gap is provided between said annular support member and said base member for permitting relative radial movement between said base member and said protective member.

2. An information storage device according to claim 1 wherein: said annular support member and said base member have substantially equal thickness.

3. An information storage device according to claim 2 wherein: said annular support member and said base member have respective upper surfaces lying in a first plane and lower surfaces lying in a second plane.

4. An information storage device according to claim 3 wherein said one disc-shaped protective member overlies said upper surface of said base member and said device further comprises a second disc-shaped protective member overlying said lower surface of said base member, fastened thereto and fastened to said lower surface of said support member.

5. An information storage device according to claim 4 wherein said recording medium is disposed with respect to said base member to provide a first information storage layer adjacent said upper surface and a second information storage layer adjacent said lower surface.

6. An information storage device according to claim 5 wherein: said base member comprises recessed regions associated with each of said upper and lower surfaces and said recording medium is disposed within each of said recessed regions.

7. An information storage device according to claim 1 wherein: said base member and said protective member are formed of materials having different thermal coefficients of expansion and said circumferential gap is dimensioned to permit relative radial movement between said base and protective members over an intended operating temperature range.

8. An information storage device according to claim 7 wherein: said base member is aluminum and said protective member is glass.

9. An information storage device according to claim 7 wherein: said support member and said base member are formed of the same material.

10. In a method of forming an information storage device in which a recording medium is deposited on a disc-shaped base member and an overlying disc-shaped protective member is fastened to said base member at an inner radial portion thereof, the improvement which comprises forming an annular support member having an inner radius greater than the outer radius of said base member to form a circumferential gap between said annular support member and said base member and fastening said protective member to said support member.

11. The method of forming an information storage device according to claim 10 wherein said annular support member is formed by separating an outermost annular portion from said disc-shaped base member.

12. The method of forming an information storage device according to claim 11 and further comprising the step of fastening a second disc-shaped protective member to said base member and said support member on surfaces thereof opposite said overlying disc-shaped protective member.

* * * * *